Patented Oct. 16, 1928.

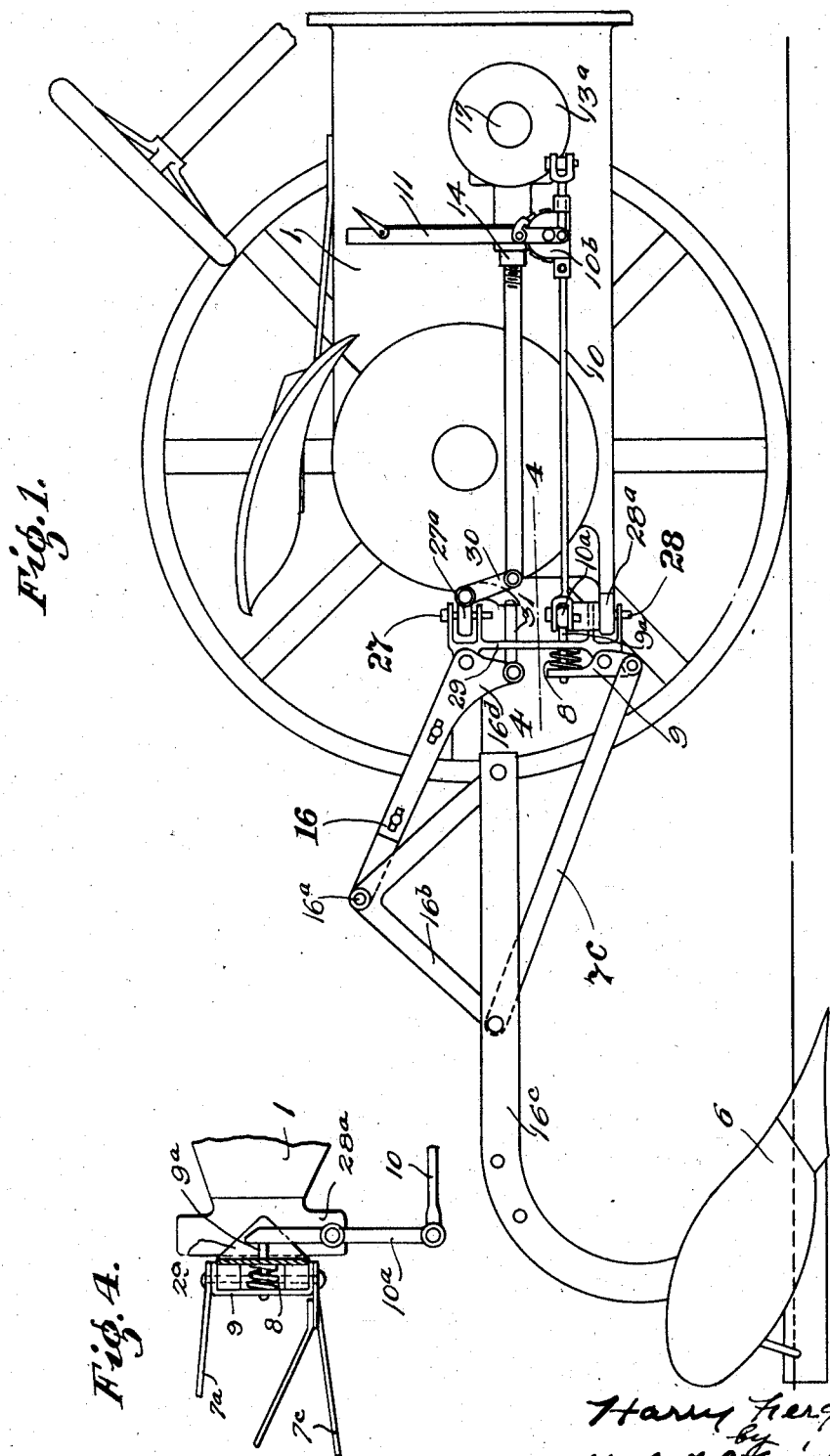

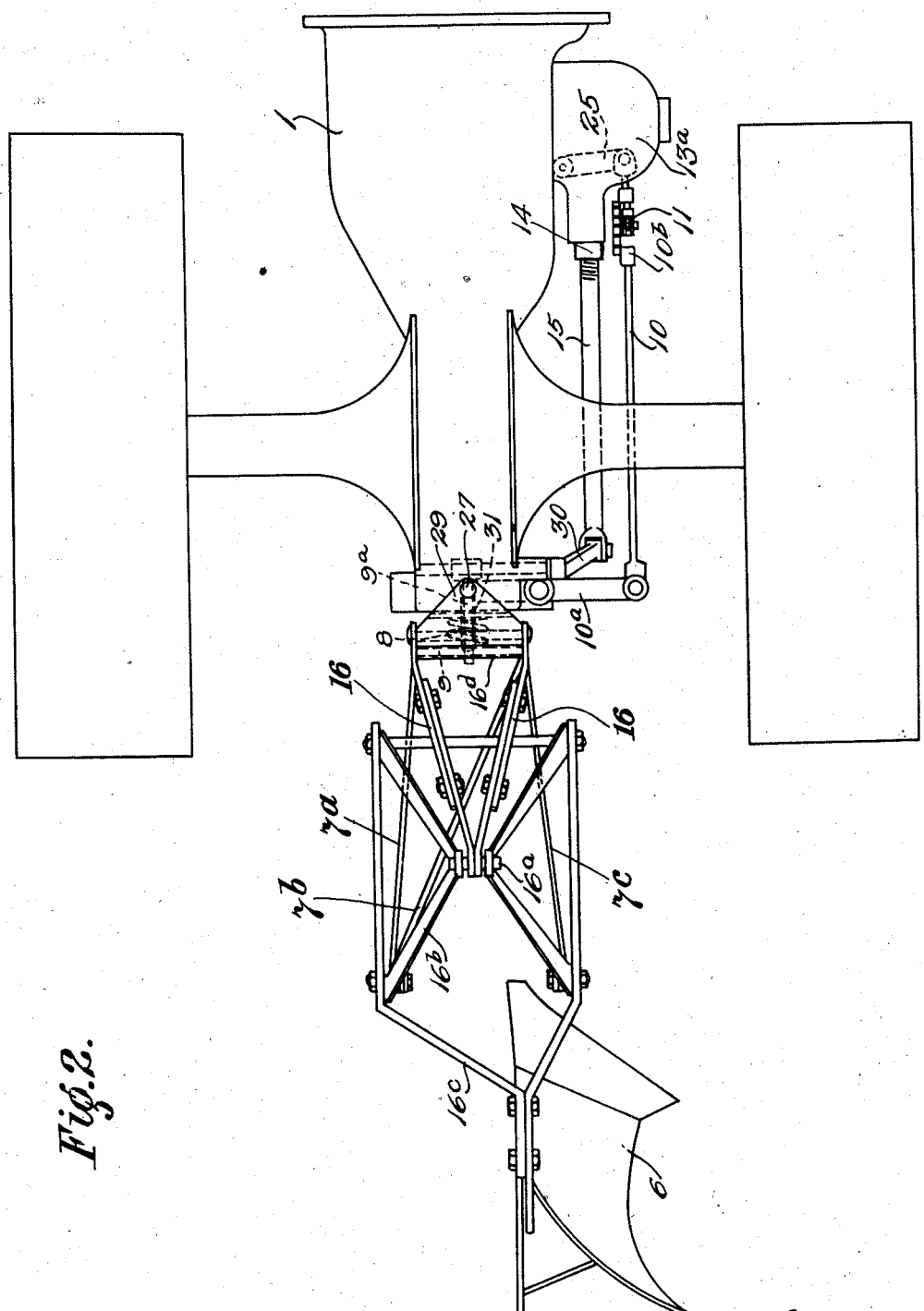

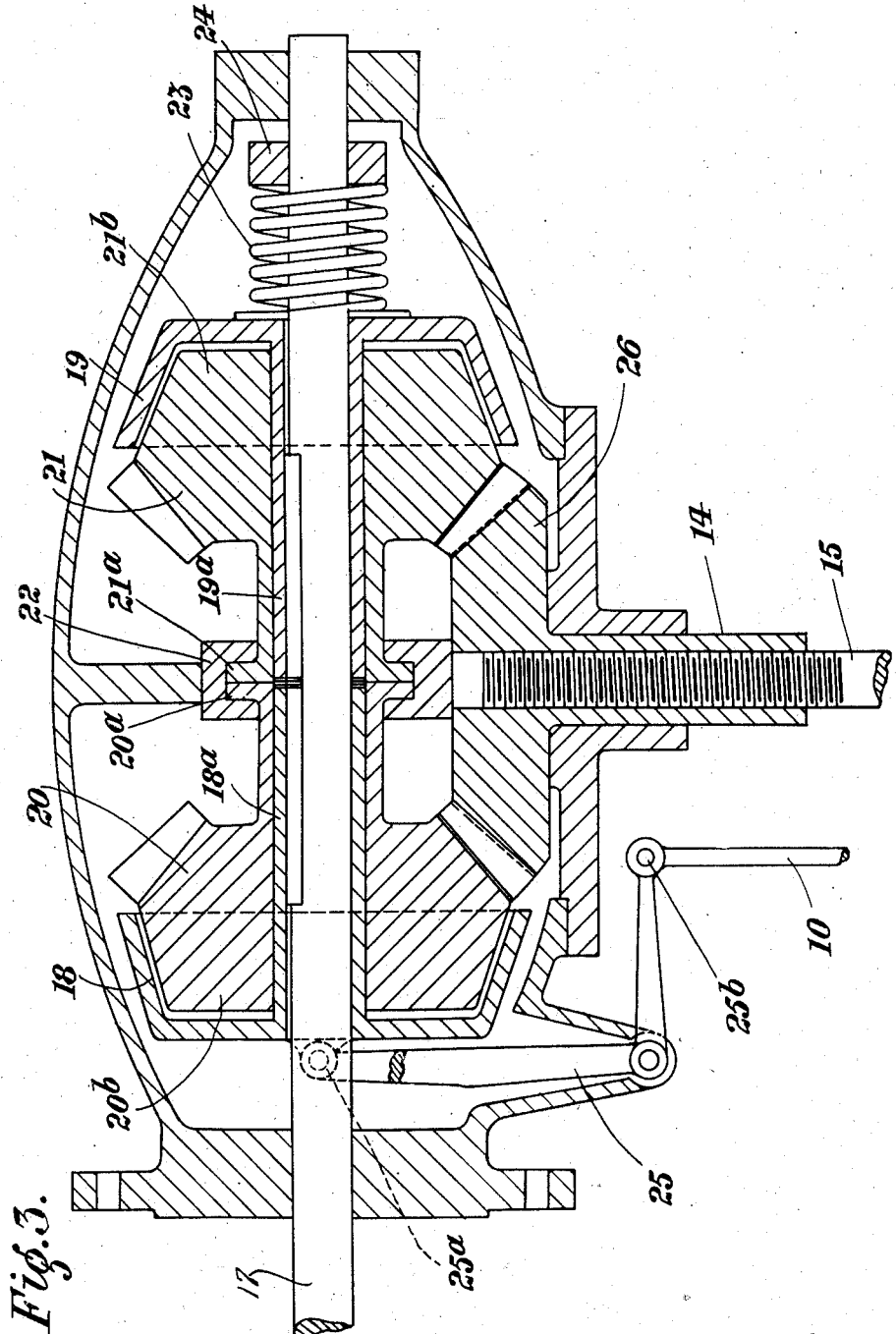

1,687,719

UNITED STATES PATENT OFFICE.

HARRY FERGUSON, OF BELFAST, IRELAND.

TRACTOR AND TRACTOR IMPLEMENT.

Application filed February 25, 1925. Serial No. 11,531.

This invention relates to tractors used for agricultural and general industrial purposes and also to tractors combined, or adapted for use, with agricultural implements.

A tractor for agricultural purposes requires to have considerable weight upon its driving wheels to give it sufficient wheel grip to draw the implement.

An object of this invention is to provide an arrangement of tractor and agricultural implement in which the tractor carries the whole weight of the implement whereby the weight of the implement becomes available for wheel grip so that a light tractor can be used with obvious advantages as regards initial and running costs.

A further object of the invention is to provide a hitch arrangement between the tractor and implement whereby the latter will be automatically kept at a regular working depth.

Other objects of the invention will appear in the following description and from the appended claims.

A convenient embodiment of the invention will now be described by way of example and with reference to the annexed drawings, whereon:—

Fig. 1 is a side elevation of a plow, part of a tractor and coupling means between them, Fig. 2 is a corresponding plan view.

Fig. 3 shows on an enlarged scale part of the mechanism shown in Figs. 1 and 2 and Fig. 4 is a fragmentary plan view on the line 4—4 of Fig. 1.

Referring to the drawings, the numeral 1 represents the tractor (here shown as an ordinary Fordson), 6 is the plow having a plow beam 16$^c$. From the plow beam a triangular structure 16$^b$ rigid therewith projects upwardly, this structure terminating in an apex through which a pivot pin 16$^a$ is passed.

The tractor is provided with two rearwardly extending lugs 27$^a$ and 28$^a$ to which an implement head 29 in the form of a plate with forwardly extending lugs is pivoted by two draw pins 27 and 28. The head 29 carries at its upper end the duplex bell crank lever 16 which is connected at one extremity by the pivot pin 16$^a$ to the triangular structure 16$^b$. The second arm 16$^d$ of the duplex bell crank lever has a push rod 31 pivoted to it. A two armed rocker 30 is pivoted on the lug 27$^a$, one of the rocker arms being coupled to a rod 15 while its second arm is connected to the push rod 31, The lower end of the head 29 has a rocking lever 9 of plate form pivoted on it, one end thereof being pivoted to lower or draft duplex links 7$^a$ and 7$^c$ which are also pivotally connected to the plow beam 16$^c$. The upper end of the rocking lever 9 rests against the short push rod 9$^a$, which connects with rod 10 by the lever 10$^a$, pivoted on the rearwardly extending lug 28$^a$. Between the upper end of the rocking lever 9 and the head 29 a compression spring 8 is fitted. The rod 10 comprises two parts, the rear of which has a block 10$^b$ attached at its end and to this block a hand lever 11 is pivoted. The lever 11 is pivoted at its lower end to a forward part of the rod 10 which part is in turn pivoted to a bell crank lever 25 which controls the operation of a clutch device 13$^a$ which will be described in detail with reference to Fig. 3. Ratchet and detent means are provided on the block and lever respectively.

Referring to Fig. 3, the power for the clutch device 13$^a$ is obtained from a shaft 17 which may be driven from the tractor in any suitable way. It may, for example, be geared to a wheel. The rotating shaft 17 has keyed on it two oppositely disposed cones 18 and 19, which are formed in one with corresponding sleeves 18$^a$ and 19$^a$ slidably keyed on the shaft 17. On the sleeve 18$^a$ and on the sleeve 19$^a$ are two oppositely disposed bevel wheels 20 and 21, the thrust of these wheels being taken by collars 20$^a$ and 21$^a$ supported in a thrust block 22. The bevels 20 and 21 have formed in one with them conic portions 20$^b$ and 21$^b$ which are disposed within corresponding conic portions of the slidable cones 18 and 19. A compression spring 23 is disposed at the outer side of the cone 19 and works between the end of the cone 19 and a collar 24 fixed on the shaft 17. The compression spring 23 serves to keep the cones 19 and 18 in contact with the end 25$^a$ of the bell crank lever 25 whose other end 25$^b$ is connected with the control rod 10. The bevel wheels 20 and 21 mesh with a bevel wheel 26 which is in one with an internally threaded sleeve 14 which engages the externally threaded rod 15 above mentioned.

The action of the mechanism is as follows. The draft of the tractor is transmitted through the links 7 to the plow and tends to turn the lever 9 about its pivot and to compress the spring 8. The spring 8 is arranged to counter-balance the predetermined normal draft, say, for example the draft corresponding to a working depth of 6" for the plow share. If, for any reason, such as inequalities in the ground, there should be a tendency for the working depth of the implement to decrease, the pull on the links 7 is immediately decreased. This causes the spring to expand and turns the lever 9 in a counter-clockwise direction (Fig. 1). The short push rod 9ᵃ moves backward, and the end of lever 10ᵃ and rod 10 attached to said end, move forward under the action of spring 23 in clutch mechanism (Fig. 3) whereupon the cone 19 of the clutch device is caused to engage the conic surface of 21ᵇ so that the continuously rotating shaft 17 will rotate the bevel wheel 21 and through it the bevel wheel 26 and sleeve 14. Rotation of the sleeve 14 will cause the rod 15 to be drawn forwards so that the rocker 30 will turn counter-clockwise and cause counter-clockwise turning of the bell crank lever 16 which has the effect of lowering the implement bodily until the depth of cut is again normal.

Conversely, when the draft on the plow increases owing to an increase in the working depth, the cone 18 will become engaged with the bevel wheel 20 and the bevel wheel 26 and sleeve 14 will be rotated in the other direction and the bell crank lever 16 will raise the plow in the ground until the depth of cut becomes normal again.

When one of the bevel wheels on the shaft 17 is in action the other will be idling on the shaft. When the implement is at the required depth of cut neither of the cones will be engaged.

In this way the implement is maintained at a constant working depth in the ground automatically and by power means.

It is essential to make provision for wear on the conic faces so that too much end play will not be developed. This may be done by the insertion of shims between the abutting faces of the sleeves 18ᵃ and 19ᵃ.

The implement, it will be noted, is free to turn laterally relative to the tractor.

It will be seen that by lifting the detent and moving the lever 11 in one way or another the effective length of the rod 10 can be altered and this will operate the clutch 13ᵃ in one direction or the other, to lift or lower the plow when it is desired to do so, manually. Means for adjusting the depth at which it is desired to operate the implement is thus provided.

One of the greatest difficulties about carrying an implement entirely on the tractor when in operation is the question of stability under torsional loads. For example, the ordinary type of cultivators are about 5' in width and these are supported at the extreme ends by wheels so as to keep a wide support for the resistance to torsion. Providing any such wide support on a tractor would mean very heavy and costly construction and increase both purchase and upkeep costs for the farmer.

In order to overcome these torsional stresses I use the light and simple mechanism hereinbefore described. The whole constitutes a triangulated structure so disposed as to offer great resistance to torsional stresses and distortion due to torsional stresses. The upper links 16 are shown in Figs. 1 and 2 provided with adjustment means whereby their length can be altered as required to tilt the implement either laterally or longitudinally or both, relative to the tractor.

It will be obvious that there are many means within the scope of this invention for keeping the implement at a regular depth in the soil.

Any of the means hereinbefore described, or any means employed according to this invention will produce a governing effect on the load or pull on the tractor, thereby avoiding constant manual control, or attention on the part of the operator of the tractor.

Some of the mechanism shown to provide the construction of a light implement and keep it in the ground has already been fully described in my pending U. S. application Serial Nos. 516,403 filed 19th November, 1921, and 281,520 filed 8th March, 1919, and in my U. S. patents already granted under Numbers 1,379,399 granted 24th May, 1921, and 1,501,652 granted 15th July, 1924.

What I claim, and desire to secure by Letters Patent is:—

1. In combination, a tractor, an agricultural implement, a draft connection between said implement and said tractor, a power unit on the tractor adapted to control the working depth of the implement in the ground, and control means for the power unit connected with the implement and sensitive to variations in the draft of the implement from a predetermined normal magnitude and causing the power unit to function on the occurrence of such draft variations to correct same and consequently the variations in the working depth of the implement.

2. In combination, a tractor, an agricultural implement, a draft connection between said implement and said tractor, yielding means acting against the draft and balancing the normal draft, a power unit on the tractor for regulating the working depth of the implement in the ground, and control means for said power unit actuated by relative movement between the tractor and the implement in the fore and aft direction and so causing functioning of the power unit on such variations occurring to correct same and consequently the variations in the working depth of the implement.

3. In combination, a tractor, an agricultural implement, a draft connection between said implement and said tractor and including yielding means balancing the normal draft, a power unit on the tractor for regulating the working depth of the implement in the ground, control means for said power unit interconnected with the draft connection by which it is actuated on variation of the draft from a predetermined normal magnitude to cause functioning of the power unit to correct said variations and consequently the variations in the working depth of the implement.

4. In combination, a tractor, an agricultural implement, a draft connection beween the implement and the tractor allowing turning of the implement about a vertical axis relative to the tractor, a power unit on the tractor for regulating the working depth of the implement in the ground, and control means for said power unit connected with the implement and sensitive to variations in the draft of the implement from a predetermined normal magnitude to cause functioning of the power unit and so to correct said variations and consequently the variations in the working depth.

5. In combination, a tractor, an agricultural implement, a draft connection between said implement and said tractor allowing turning of the implement about a vertical axis relative to the tractor and including yielding means balancing the normal draft, a power unit on the tractor for regulating the working depth of the implement in the ground, control means for said power unit interconnected with the draft connection by which it is actuated on variation of the draft from a predetermined normal magnitude to cause functioning of the power unit to correct said variations and consequently the variations in the working depth.

6. In combination, a tractor, an agricultural implement, a draft connection between said implement and said tractor, means on the tractor for lifting and lowering the implement relatively to said tractor, a power unit on the tractor for operating said means, and control means for said power unit connected with the implement and sensitive to variations of the draft from a predetermined normal magnitude to cause functioning of said power unit on such variations occurring and to correct same and consequently the variations in the working depth of the implement.

7. In combination, a tractor, an agricultural implement, a draft connection between said implement and said tractor allowing turning of the implement about a vertical axis relative to the tractor, yielding means embodied in the draft connection and balancing the normal draft, means on the tractor for lifting and lowering the implement relatively to the tractor, a power unit on the tractor for operating said means, and control means for said power unit connected with the implement and sensitive to variations in the draft from a predetermined normal magnitude to cause functioning of said power unit on such variations occurring and to correct same and consequently the variations in the working depth of the implement.

8. In combination, a tractor, an agricultural implement, a bell crank lever pivoted on said tractor, upstanding triangulated members on the implement to which the bell crank lever is pivoted, a power unit on the tractor geared to said bell crank lever, a control device for said power unit, a rocking lever pivotally supported by said tractor, draft links between said rocking lever and the implement, a spring secured to the tractor and to the rocking lever and balancing the normal draft, and a connection between the rocking lever and the control device which latter on movement of the spring is actuated to cause the power unit to operate the bell crank lever and thus maintain the implement at a regular working depth.

9. In combination, a tractor, an agricultural implement, a draft connection between said implement and said tractor, a power unit on the tractor adapted to control the working depth of the implement in the ground, control means for the power unit connected with the implement and sensitive to variations in the draft of the implement from a predetermined normal magnitude and causing the power unit to function on the occurrence of such variations to correct same and consequently the variations in the working depth of the implement, and means for manually controlling the operation of the power unit and determining the normal working depth.

10. In combination, a tractor, an agricultural implement, a bell crank lever pivoted on said tractor, upstanding triangulated members on the implement to which the bell crank lever is pivoted, a power unit on the tractor geared to said bell crank lever, a control device for said power unit, a rocking lever pivotally supported by said tractor, draft links between said rocking lever and the implement, a spring secured to the tractor and to the rocking lever and balancing the normal draft, a connection between the rocking lever and the control device which latter on movement of the spring is actuated to cause the power unit to operate the bell crank lever and thus maintain the implement at a regular working depth, and means embodied in said connection for altering its effective length and manually controlling the operation of the power unit and the position of the implement.

11. In combination, a tractor, an agricultural implement, a bell crank lever pivotally carried by the tractor, upstanding triangulated members on the implement to which said bell crank lever is connected to carry said implement, a power unit on the tractor, a control device for said power unit, an internally threaded member rotatable by said power unit, a rod screwed at one end into said internally threaded member and connected at the other end to said bell crank lever to transmit motion of the power unit thereto, a rocking lever pivotally supported by the tractor, draft links between said rocking lever and said implement, a spring on the tractor acting on said rocking lever and balancing the normal draft and a connection between said rocking lever and said control device, and which on variations in the draft, causes the power unit to keep said implement automatically at a regular depth of cut.

12. In combination, a tractor, an agricultural implement, a bell crank lever pivotally carried by the tractor, upstanding triangulated members on the implement to which said bell crank lever is connected to carry said implement, a power unit on the tractor, an internally threaded member rotatable by said power unit, a rod screwed at one end into said internally threaded member and connected at the other end to said bell crank lever to transmit motion of the power unit thereto, a rocking lever pivotally supported by the tractor, draft links between said rocking lever and said implement, a spring on the tractor acting on said rocking lever and balancing the normal draft, a rod connecting said rocking lever to said power unit and which on variations in the draft, brings said power unit into operation, and a hand lever for lengthening or shortening said rod to control said power unit by hand to raise or lower the implement.

13. In combination, a tractor, an agricultural implement coupled thereto, means on said tractor for lifting and lowering said implement relatively to the tractor, a system of friction clutches operatively connected to the tractor propelling means and geared to said implement lifting and lowering means, a draft connection between said implement and said tractor, and a connection between said draft connection and the system of friction clutches to engage one or other of said friction clutches on variations in the draft from a predetermined normal magnitude and move the implement up or down, to keep said implement automatically at a regular depth of cut.

14. In combination, a tractor, an agricultural implement, a bell crank lever pivotally supported by the tractor, upstanding triangulated members on the implement to which said bell crank lever is connected to carry said implement, a system of friction clutches operatively connected to the tractor propelling motor, an internally threaded member rotatable by said power unit, a rod screwed at one end into said internally threaded member and connected at the other end to said bell crank lever to transmit motion of the clutches thereto, a rocking lever pivotally supported by the tractor, draft links between said rocking lever and said implement, a spring on the tractor acting on said rocking lever and balancing the normal draft and a connection between said rocking lever and said clutches to engage one or other of the said friction clutches and thereby to keep said implement automatically at a regular depth of cut.

15. In combination, a tractor, an agricultural implement, a bell crank lever pivotally carried by the tractor, upstanding triangulated members on the implement to which said bell crank lever is connected to carry said implement, a system of friction clutches operatively connected to the tractor propelling motor, an internally threaded member rotatable by said clutches, a rod screwed at one end into said internally threaded member and connected at the other end to said bell crank lever to transmit motion of the clutches thereto, a rocking lever pivotally supported by the tractor, draft links between said rocking lever and said implement, a spring on the tractor acting on said rocking lever and balancing the normal draft, a rod connecting said rocking lever to said system of friction clutches to engage one or other of said friction clutches on variations in the draft, and a hand lever for lengthening or shortening said rod to control said clutches by hand to raise or lower the implement.

16. In combination, a tractor, an agricultural implement, a bell crank lever pivotally carried by the tractor, upstanding triangulated members on the implement to which said bell crank lever is connected to carry said implement, a shaft driven by said tractor, bevel wheels keyed to said shaft, inner clutch members on said bevel wheels, outer clutch members movable axially along said shaft to engage said inner clutch members, an internally threaded member rotatable by said clutches, a rod screwed at one end into said internally screwed member and connected at the other end to said bell crank lever to transmit motion of the clutches thereto, a rocking lever pivotally supported by the tractor, draft links between said rocking lever and said implement, a spring on the tractor acting on said rocking lever and balancing the normal draft and a connection between said rocking lever and said clutches to engage one or other of said friction clutches and thereby to keep said implement automatically at a regular depth of cut.

17. In combination, a tractor, an agricultural implement, a bell crank lever pivotally carried by the tractor, upstanding triangulated members on the implement to which said bell crank lever is connected to carry said implement, a shaft driven by said tractor, bevel wheels keyed to said shaft, inner clutch members on said bevel wheels, outer clutch members movable axially along said shaft to engage said inner clutch members, an internally screwed member rotatable by said clutches, a rod screwed at one end into said internally screwed member and connected at the other end to said bell crank lever to transmit motion of the clutches thereto, a rocking lever pivotally supported by the tractor, draft links between said rocking lever and said implement, a spring on the tractor acting on said rocking lever and balancing the normal draft, a rod connecting said rocking lever to said system of friction clutches to engage one or other of said friction clutches on variations in the draft and a hand lever for lengthening or shortening the said rod to control said clutches by hand to raise or lower the implement.

In testimony whereof I affix my signature.

HARRY FERGUSON.